United States Patent
Tsuda et al.

(10) Patent No.: US 8,567,262 B2
(45) Date of Patent: Oct. 29, 2013

(54) ELECTRIC POWER STEERING APPARATUS FOR SADDLE-RIDE TYPE VEHICLE

(75) Inventors: Tsuyoshi Tsuda, Saitama (JP); Takeshi Wakabayashi, Saitama (JP); Shinichiro Kato, Saitama (JP); Hiroyuki Kaneta, Saitama (JP); Katsumi Sahoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 298 days.

(21) Appl. No.: 13/073,441

(22) Filed: Mar. 28, 2011

(65) Prior Publication Data

US 2011/0239786 A1    Oct. 6, 2011

(30) Foreign Application Priority Data

Mar. 31, 2010    (JP) .................................. 2010-080927

(51) Int. Cl.
*G01L 3/02*    (2006.01)

(52) U.S. Cl.
USPC .................................................. 73/862.335

(58) Field of Classification Search
USPC ...................... 73/862.331–862.335
See application file for complete search history.

(56) References Cited

U.S. PATENT DOCUMENTS

| 7,239,972 | B2 * | 7/2007 | Deville ........................... 702/94 |
| 7,624,653 | B2 * | 12/2009 | Watanabe et al. ......... 73/862.331 |
| 8,381,868 | B2 * | 2/2013 | Hamakita ..................... 180/444 |
| 2006/0185927 | A1 | 8/2006 | Sakamoto et al. |
| 2007/0283767 | A1 * | 12/2007 | Watanabe et al. ......... 73/862.331 |
| 2007/0295111 | A1 | 12/2007 | Shimizu et al. |

FOREIGN PATENT DOCUMENTS

JP    2007-303996 A    11/2007

* cited by examiner

*Primary Examiner* — Max Noori
(74) *Attorney, Agent, or Firm* — Birch, Stewart, Kolasch & Birch, LLP (57) ABSTRACT

An electric power steering apparatus includes a steering shaft for transmitting a steering force of a steering handlebar to a wheel and an upper bearing provided at a location upward from a vehicle body frame so as to rotatably support an upper part of the steering shaft. A lower bearing is provided at a location downward from the vehicle body frame, so as to rotatably support a lower part of the steering shaft. A torque sensor detects a torsional torque applied to the steering shaft. An electric motor imparts a steering force to the steering shaft based on the torsional torque detected by the torque sensor. The electric motor is mounted to the steering shaft between the upper bearing and the lower bearing, while the torque sensor is mounted to the steering shaft at place upward from the upper bearing.

19 Claims, 10 Drawing Sheets

ELECTRIC POWER STEERING APPARATUS FOR SADDLE-RIDE TYPE VEHICLE

CROSS-REFERENCE TO RELATED APPLICATIONS

This application claims priority under 35 U.S.C. §119(a) to Application No. 2010-080927, filed in Japan on Mar. 31, 2010, the entirety of which is expressly incorporated herein by reference.

BACKGROUND OF THE INVENTION

1. Field of the Invention

The prevent invention relates to an electric power steering apparatus for a saddle-ride type vehicle.

2. Description of Background Art

An electric power steering apparatus has heretofore been known in the background art, which detects a torsional torque produced in a steering shaft and provides steering assist according to the torsional torque.

The electric power steering apparatuses of this type include one which employs a magnetostrictive sensor as a torque sensor (see Japanese Application No. 2007-303996). This magnetostrictive sensor includes a magnetostrictive film formed on a surface of the steering shaft and a detecting coil wound around the magnetostrictive film.

SUMMARY OF THE INVENTION

It should be noted that the magnetostrictive sensor responds not only to the torsional torque but also to a bending load. Therefore, the application of the magnetostrictive sensor to a vehicle with a great bending load on the steering shaft is limited. However, if this problem is solved by using a large number of bearings so as to prevent the bending of the steering shaft or by providing a link mechanism such as to prevent input of the bending load, the apparatus is increased in size. This makes it difficult to apply the magnetostrictive sensor to vehicles, such as all terrain vehicles, which are small is size but have a great bending load input to the steering shaft.

In view of this, the present invention has an object to provide an electric power steering apparatus for a saddle-ride type vehicle that is adapted for easy reduction of the influence of a bending load on the torque sensor.

As a solution to the above problem, a first aspect of the invention provides an electric power steering apparatus for a saddle-ride type vehicle including: a steering handlebar (such as a steering handlebar 21 according to an embodiment thereof); a steering shaft (such as a steering shaft 22 according to the embodiment) for transmitting a steering force of the steering handlebar to a wheel; an upper bearing (such as an upper bearing 24 according to the embodiment) provided at a location upward from a vehicle body frame (such as a vehicle body frame 2 according to the embodiment) constituting a vehicle body and rotatably supporting an upper part of the steering shaft; a lower bearing (such as a lower bearing 25 according to the embodiment) provided at a location downward from the vehicle body frame and rotatably supporting a lower part of the steering shaft; a torque sensor (such as a torque sensor 26 according to the embodiment) for detecting a torsional torque applied to the steering shaft; and an electric motor (such as an electric motor unit 27 according to the embodiment) for imparting a steering force to the steering shaft based on the torsional torque detected by the torque sensor, wherein the electric motor is mounted to the steering shaft between the upper bearing and the lower bearing, while the torque sensor is mounted to the steering shaft at location upward from the upper bearing.

According to a second aspect of the present invention, the toque sensor is a magnetostrictive torque sensor including magnetostrictive films (such as a first magnetostrictive film 30 and a second magnetostrictive film 31 according to the embodiment) formed on the steering shaft and detecting coils (such as a first detecting coil 32 and a second detecting coil 33 according to the embodiment) wound around the magnetostrictive films.

According to a third aspect of the present invention, the steering shaft has a tie-rod mounting plate (such as a Pitman arm 54 according to the embodiment) mounted to a lower end thereof, the tie-rod mounting plate is mounted with a tie rod (such as tie rods 55, 55 according to the embodiment) for transmitting the steering force of the steering shaft to the wheel, and the tie-rod mounting plate is mounted to the steering shaft at a location downward from the lower bearing.

According to a fourth aspect of the present invention, the vehicle body frame is provided with a lower-bearing support bracket (such as a lower-bearing support bracket 47 according to the embodiment) for supporting the lower bearing, and the electric motor is mounted to the lower-bearing support bracket.

According to a fifth aspect of the present invention, the electric power steering apparatus further includes a cylindrical reinforcement case (such as a housing 37 according to the embodiment) covering an outer periphery of the torque sensor and having a length in an axial direction of the steering shaft.

According to a sixth aspect of the present invention, the reinforcement case is secured to the steering shaft.

According to a seventh aspect of the present invention, the reinforcement case is provided, on a top thereof, with a mounting portion (such as a mounting portion 44 according to the embodiment) for the steering handlebar.

According to an eighth aspect of the present invention, the reinforcement case is secured to the vehicle body frame and rotatably supports the steering shaft upward from the upper bearing by means of bearings (such as bearings 72 and 73 according to the embodiment).

According to the first aspect of the present invention, the influence of a bending load on the torque sensor can be reduced easily. The steering shaft portion between the upper bearing and the lower bearing is prone to bending caused by motor load and flexure caused by a ground reaction force transmitted from the wheels. However, the torque sensor is located upward from the upper bearing so as to be less affected by the bending and flexure of the steering shaft. The saddle-ride type vehicle is normally designed such that the length of a steering shaft portion upward from the upper bearing is shorter than that of the steering shaft portion between the upper bearing and the lower bearing. In this case, the steering shaft portion upward from the upper bearing is reduced in flexural bending so that the influence of shaft bending on the torque sensor can be reduced.

According to the second aspect of the present invention, the magnetostrictive sensor can be made less affected by the bending load, while the structure of the electric power steering apparatus can be made simpler and smaller than a heretofore known structure, which employs a mechanical torque sensor.

According to the third aspect of the present invention, a portion of the steering shaft that is subjected to the greatest bending load caused by the reaction force from the road surface is located downward from the lower bearing, so that the two bearings are interposed in the route to the torque sensor mounting portion. Thus, the transmission of the bending load to the torque sensor mounting portion can be further reduced.

According to the fourth aspect of the present invention, the steering shaft portion upward from the lower bearing can be encased in a case of the electric motor. If this case has a length in the axial direction of the steering shaft and includes a bearing for supporting the steering shaft, the bending of the steering shaft can be suppressed by this case.

According to the fifth aspect of the present invention, the bending of the steering shaft portion upward from the upper bearing can be suppressed by the reinforcement case.

According to the sixth aspect of the present invention, the bending of the steering shaft portion upward from the upper bearing can be suppressed, because the steering shaft and the reinforcement case are twisted together.

According to the seventh aspect of the present invention, the number of components can be reduced by utilizing the reinforcement case.

According to the eighth aspect of the present invention, the bending of the steering shaft portion upward from the upper bearing can be suppressed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will now be described with reference to the accompanying drawings, wherein the same reference numerals have been used to identify the same or similar elements throughout the several views.

First Embodiment

Figure 1:
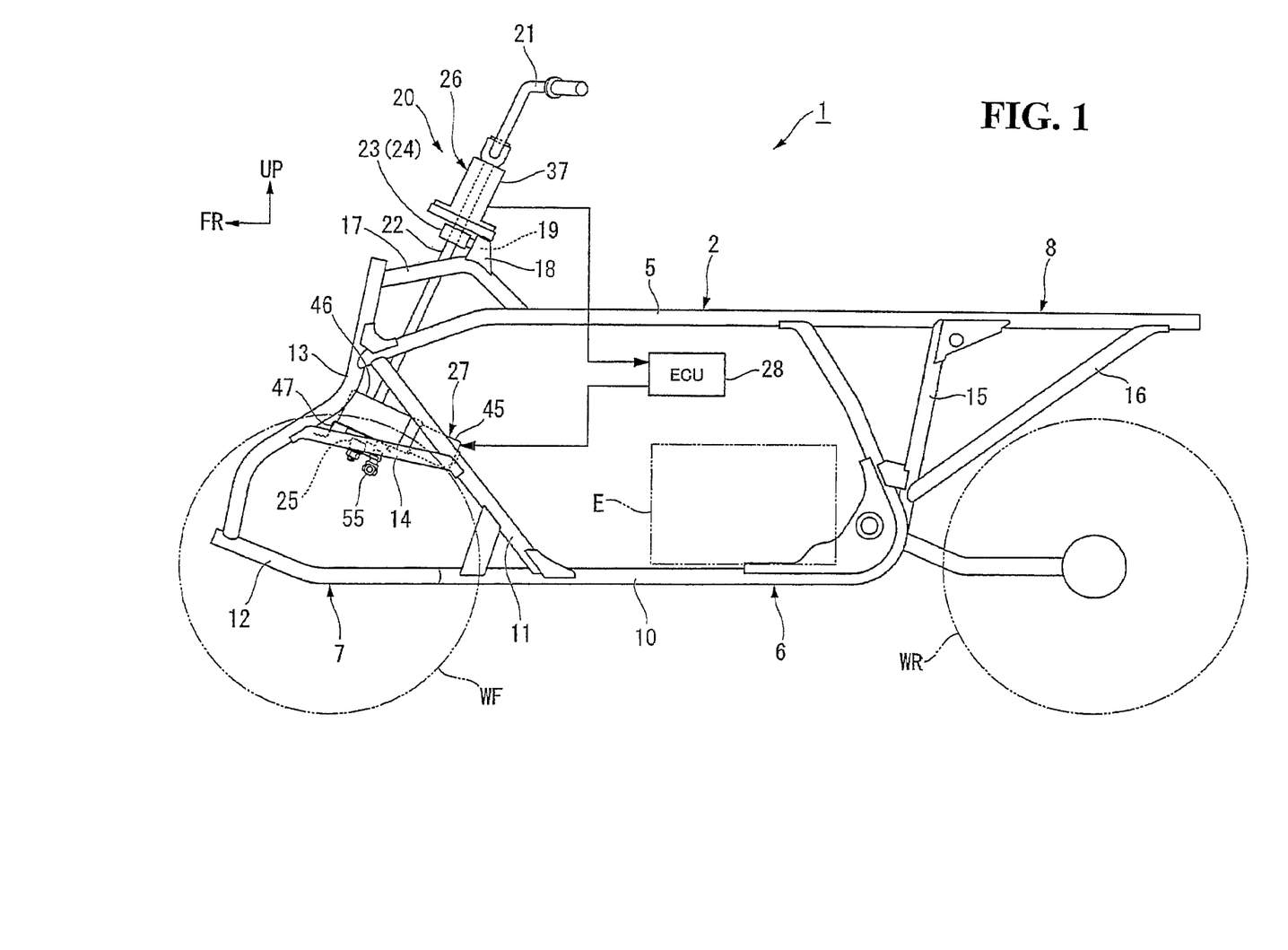
FIG. 1 is a side view showing a saddle-ride type vehicle according to a first embodiment of the invention.

FIG. 1 shows a side elevation of a saddle-ride type vehicle 1 equipped with an electric power steering apparatus 20 according to a first embodiment of the invention. The straddle type vehicle 1 is a so-called ATV (All Terrain Vehicle) principally designed for irregular terrain running. The vehicle includes a vehicle body frame 2 provided with right and left front wheels WF and right and left rear wheels WR, which are low-pressure balloon tires having a relatively large diameter. The vehicle body frame 2 is further provided with an engine unit E between the front wheels WF and the rear wheels WR. An arrow FR in the drawing indicates a forward direction of the vehicle while an arrow UP indicates an upward direction thereof.

The vehicle body frame 2 is constructed by combining together plural kinds of steel materials by welding or the like. The vehicle body frame includes main frames 5, 5 extending from a vehicle front to a vehicle rear in a longitudinal direction thereof. The body frame further includes: a center frame portion 6 defining a parallelogram frame, as seen in side view, the upper side of which is defined by a central portion of the main frame 5, 5; a front frame portion 7 connected with a front of the center frame portion 6 so as to suspend the front wheels WF; and a rear frame portion 8 connected with a rear of the center frame portion 6 so as to support a ride seat and the like not shown.

The center frame portion 6 includes: a pair of right and left lower pipes 10, 10 extended longitudinally of the vehicle and then bent upward to join the main frames 5, 5; and a pair of right and left slant pipes 11, 11 each extended upward from one end thereof connected with a front of each of the lower pipes 10, 10 and connected to a front of the main frame 5, 5 at the other end thereof. The front frame portion 7 includes: a front lower pipe 12, 12 a front half of which is inclined upward and a rear half of which is extended substantially horizontally to be connected to a front end of the lower pipe 10, 10; a pair of right and left front cushion pipes 13, 13 each interconnecting a front end of the main frame 5, 5 and a front end of the front lower pipe 12, 12; and a pair of right and left front sub-pipes 14, 14 each connected between a middle of the front cushion pipe 13, 13 and a middle of the slant pipe 11, 11.

The engine unit E is a water cooled engine and is vertically mounted in the center frame portion 6 with an unillustrated crankshaft thereof oriented in the longitudinal direction of the vehicle. The rear frame portion 8 is mainly formed of a part of a rear of the main frame 5, 5, further including a pair of right and left lower sub-pipes 15, 15 each interconnecting the main frame 5, 5 and a bent portion of the lower pipe 10, 10, and a pair of right and left lower sub-pipes 16, 16 each interconnecting a lower part of the lower sub-pipe 15, 15 and a rear end of the main frame 5, 5. The rear frame portion 8 is provided with an occupant seat (not shown).

The front cushion pipe 13, 13 of the front frame portion 7 projects upward from a joint with the main frame 5, 5 and has an upper end connected with one end of a pair of right and left paired L-shaped pipes 17, 17. The other end of the L-shaped pipe is connected to the main frame 5, 5. Metal plate members 18, 18 are welded to bent portions of the pair of right and left L-shaped pipes 17, 17 so as to project upward therefrom respectively. A cross member 19 (indicated by a broken line in the drawing and extended in a direction perpendicular to the drawing surface) bridges these plate members 18, 18. These plate members 18, 18 and cross member 19 are included as components of the vehicle body frame 2.

The electric power steering apparatus 20 according to the embodiment is constructed in a front portion of the vehicle and includes: a steering handlebar 21, a steering shaft 22 for transmitting a steering force of the steering handlebar 21, a magnetostrictive torque sensor unit 26, and an electric motor unit 27. In this electric power steering apparatus 20, a torsional torque applied to the steering shaft 22 is detected by the magnetostrictive torque sensor unit 26 while the electric motor unit 27 imparts a steering force to the steering shaft 22 based on the detected torsional torque. The electric motor unit 27 imparts the steering force to the steering shaft 22 under the control of an ECU 28 as a controller, which is electrically connected with the magnetostrictive torque sensor unit 26 and the electric motor unit 27.

The steering shaft 22 has an upper part rotatably supported by an upper bearing 24 accommodated in a bracket 23 mounted centrally of the cross member 19 in a widthwise direction of the vehicle, and has a lower part rotatably supported by a lower bearing 25 disposed at a lower part of the front frame portion 7. These upper bearing 24 and lower bearing 25 are included in the components of the electric power steering apparatus 20.

Figure 2:
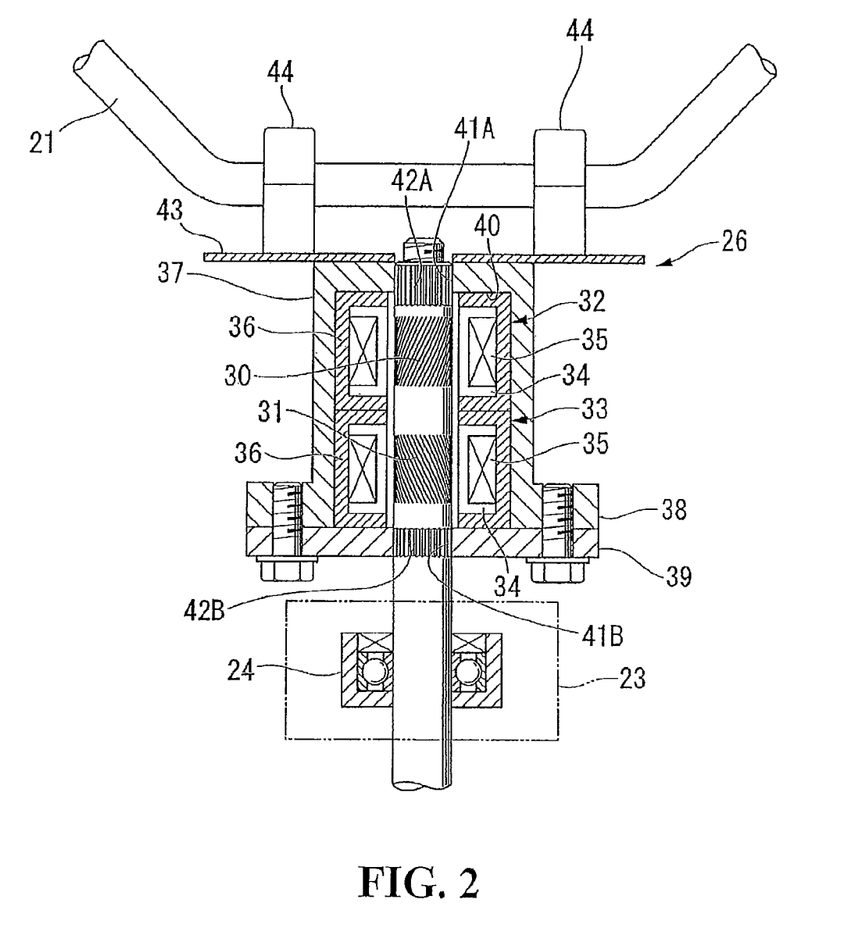
FIG. 2 is a sectional view showing an upper part of a steering system of the straddle type vehicle according to the first embodiment of the invention.

The magnetostrictive torque sensor unit 26 is mounted to the steering shaft 22 at place upward from the upper bearing 24. As shown in FIG. 2, the magnetostrictive torque sensor unit includes: a first magnetostrictive film 30 and a second magnetostrictive film 31 formed on the steering shaft 22 and arranged one above the other; and a first detecting coil 32 and a second detecting coil 33 wound around the first magnetostrictive film 30 and the second magnetostrictive film 31, respectively. The first magnetostrictive film 30 and the second magnetostrictive film 31 are composed of an annular magnetostrictive film formed on the entire outer periphery of the steering shaft 22 and varied in magnetostrictive property according to torque. The magnetostrictive film may be a Ni—Fe alloy film deposited by vapor a plating method, for example. The first magnetostrictive film 30 and the second magnetostrictive film 31 have magnetic anisotropies in opposite directions so that the first magnetostrictive film 30 exhibits magnetostriction in a direction different from that of the second megnetostrictive film 31.

The first detecting coil 32 and the second detecting coil 33 as a pair include a pair of upper and lower cylindrical coil bobbins 34, 34 penetrated by the steering shaft 22; coils 35, 35 wound about the respective coil bobbins 34, 34; and magnetic yokes 36, 36 accommodating the coil bobbins 34, 34 and the coils 35, 35. The detecting coils are accommodated in a housing 37 that is formed in a cylindrical shape to encase an upper part of the steering shaft 22 and has a length in an axial direction of the steering shaft 22. The housing 37 is disposed upward from the upper bearing 24 and the bracket 23 accommodating the upper bearing 24. The housing is open at a bottom so as to allow the steering shaft 22 to penetrate therethrough. The housing has a plate 39 fastened to a flange 38 formed around the bottom thereof so as to close the opening in the bottom. The housing 37 retains the yokes 36, 36 between an upper circumferential inside wall 40 thereof and the plate 39 so as to position the coils 35, 35 around the first magnetostrictive film 30 and the second magnetostrictive film 31. Although not shown in the drawing, couplers are connected to the coils 35, 35 such as to carry detection signals from the coils 35, 35 to the outside.

The housing 37 is integrated with the steering shaft 22 as follows. A spline hole 41A circumferentially formed with a plurality of grooves is formed centrally of the upper circumferential inside wall 40 of the housing 37, while a spline hole 41B circumferentially formed with a plurality of grooves is formed centrally of the plate 39. Spline grooves 42A formed at an upper end of the steering shaft 22 are spline-fitted into the spline hole 41A, while spline grooves 42B formed on the steering shaft 22 at place downward from the second magnetostrictive film 31 are spline-fitted into the spline hole 41B. Thus, the housing 37 and the steering shaft 22 are integrated into one piece so that the steering shaft 22 rotates to bring the housing 37 into rotation, which brings the first detecting coil 32 and the second detecting coil 33 into rotation. The housing 37 is provided, on a top thereof, with a plate member 43 formed with a hole penetrated by the upper end of the steering shaft 22. The plate member 43 is provided with a mounting portion 44 for the steering handlebar 21. The steering handlebar 21 is assembled to the mounting portion 44. The plate member 43 is securely welded to the top of the housing 37.

Figure 3:
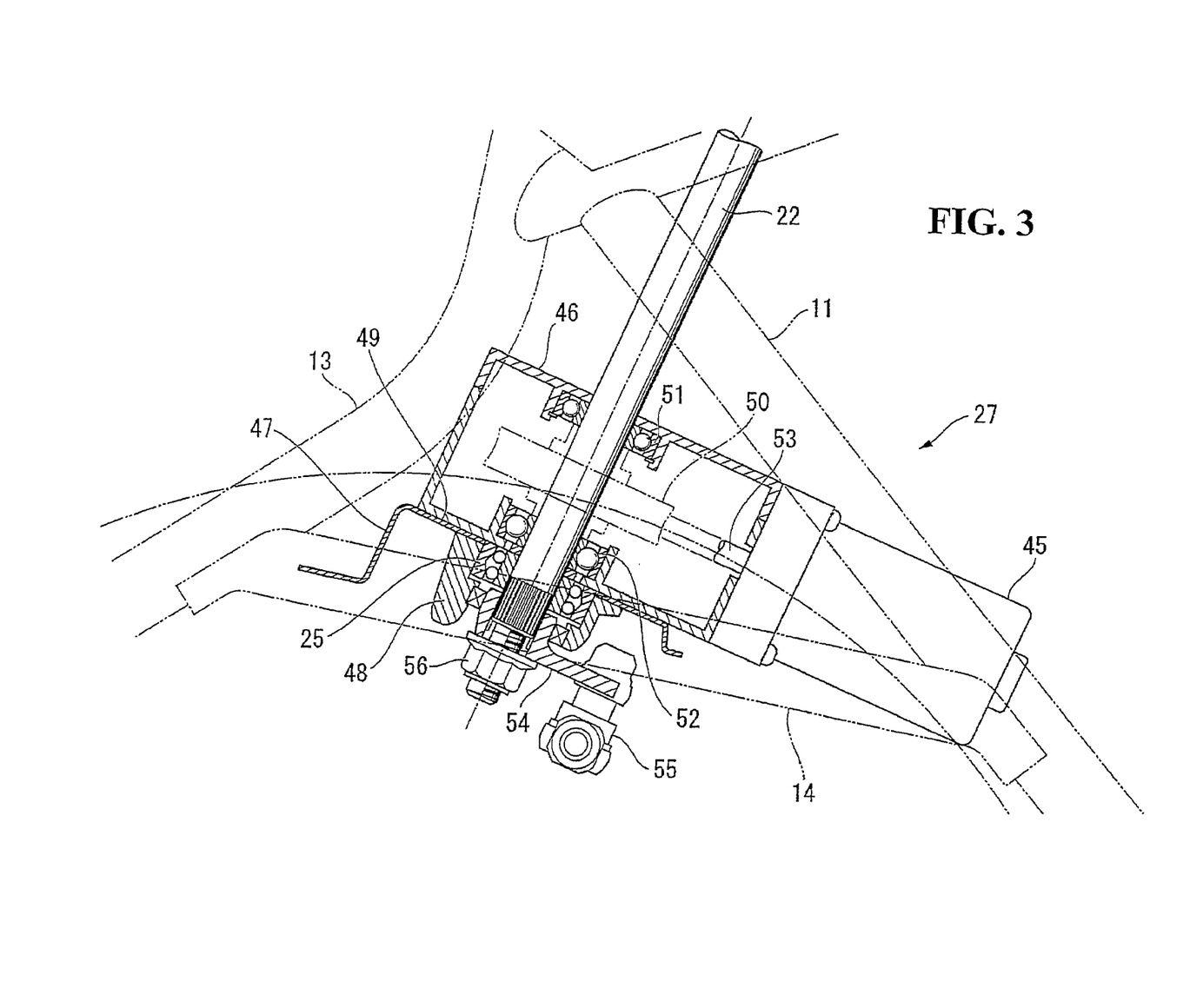
FIG. 3 is a sectional view showing a lower part of the steering system of the straddle type vehicle according to the first embodiment of the invention.

Referring to FIG. 1, the electric motor unit 27 is mounted to the steering shaft 22 between the upper bearing 24 and the lower bearing 25. The electric motor unit includes an electric-motor main body 45 and a reduction gearbox 46 combined with the electric-motor main body 45. As shown in FIG. 3, welded to the front sub-pipes 14, 14 is a lower-bearing support bracket 47 made of a metal plate formed with an opening penetrated by the steering shaft 22. Welded to a lower side of the lower-bearing support bracket 47 is a bearing mounting portion 48 for accommodating the lower bearing 25. An upper side of the lower-bearing support bracket 47 defines a seat 49 for the reduction gearbox 46. The reduction gearbox 46 is fixedly seated on the seat 49 with bolts (not shown).

The reduction gearbox 46 is shaped like a box encasing a part of the lower part of the steering shaft 22 and a worm wheel 50 mounted to the steering shaft 22. The reduction gearbox is provided with bearings 51 and 52 on an upper side and a lower side thereof, the bearings allowing the steering shaft 22 to penetrate therethrough and rotatably supporting the steering shaft. The reduction gearbox 46 is formed with a hole at a rear thereof so that a shaft 53 of the electric-motor main body 45 penetrates therethrough. The electric-motor main body 45 is fixed to the reduction gearbox 46 with the shaft 53 thereof extended into the reduction gearbox 46. The worm wheel 50 is meshed with a worm gear (not shown) formed at a distal end of the shaft 53 of the electric-motor main body 45. Accordingly, a driving force of the electric-motor main body 45 is transmitted to the steering shaft 22.

A Pitman arm 54 is securely spline-fitted on a lower end of the steering shaft 22 projecting downward from the lower bearing 25. The Pitman arm 54 has two ends which extend obliquely backward from the steering shaft 22 with respect to the vehicle and which are mounted with tie rods 55, 55, respectively. The tie rods 55, 55 extend to the right and left so as to be connected with the front wheels WF, respectively whereby the steering force is transmitted from the steering shaft 22 to the front wheels WF. A bolt 56 is fastened to the lower end of the steering shaft 22 projecting from the Pitman arm 54, fixing and retaining the Pitman arm 54 onto the steering shaft 22.

Figure 4:
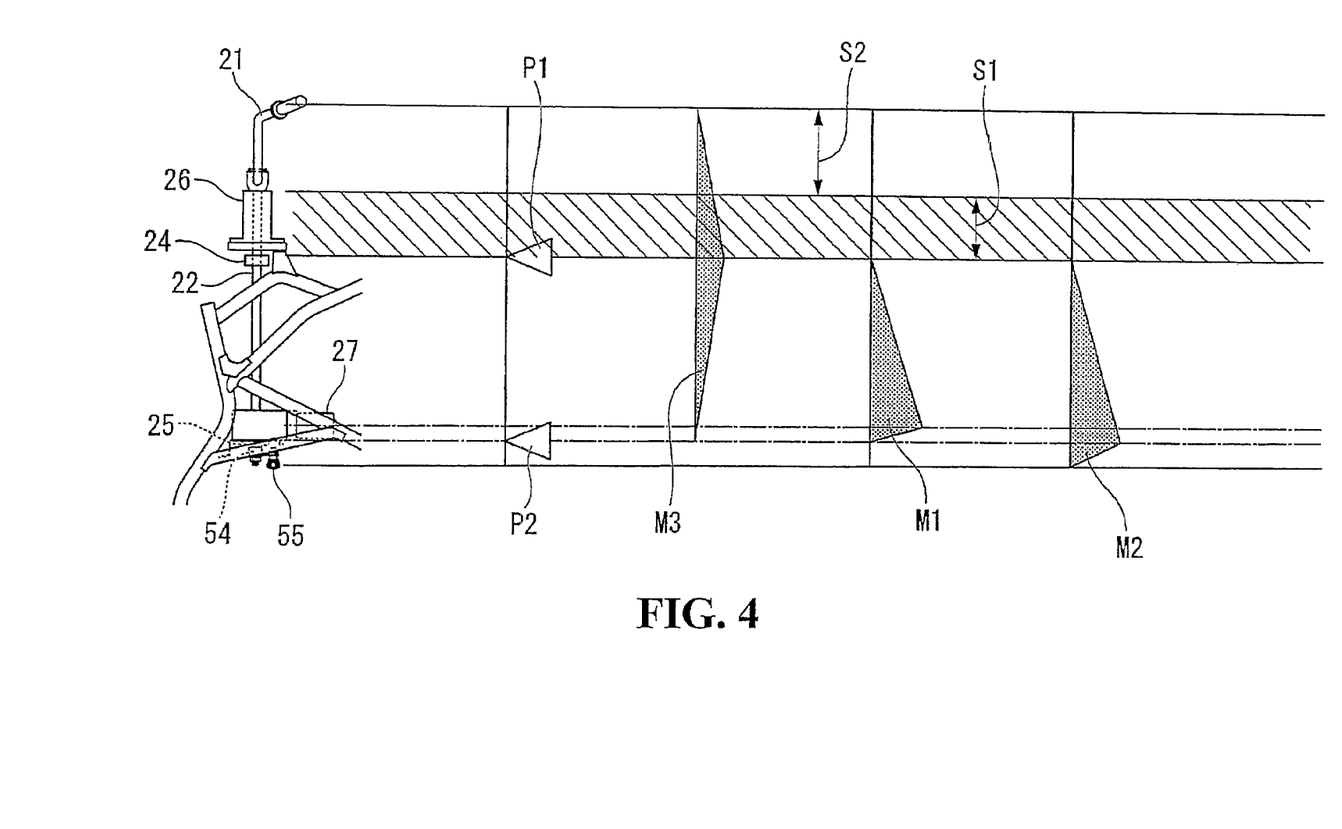
FIG. 4 is a diagram showing bending moment on a steering shaft of the steering system, particularly on an upper bearing, a lower bearing and a tie rod mounting portion thereof.

According to the first embodiment of the present invention, the influence of the bending load on the magnetostrictive torque sensor unit 26 can be easily reduced without using many bearings for supporting the steering shaft 22. Since the magnetostrictive torque sensor unit 26 is disposed upward from the upper bearing 24, the magnetostrictive torque sensor unit 26 can be made less affected by the bendings of the steering shaft. As shown in FIG. 4, a steering shaft 22 between the upper bearing 24 supporting the steering shaft 22 at position P1 in the drawing and the lower bearing 25 supporting the steering shaft 22 at position P2 in the drawing is prone to bending or flexure (a region M1 in the drawing) caused by a motor load of the electric motor unit 27 and to bending or flexure (a region M2 in the drawing) caused by reaction force transmitted from the road surface to the steering shaft via the tie rods 55, 55 and the Pitman arm 54, or the steering shaft 22 is prone to flexure due to oscillation during running. However, the influence of these bending loads on the magnetostrictive torque sensor unit 26 can be reduced because the magnetostrictive torque sensor unit 26 is disposed upward from the upper bearing 24. It is noted that a region M3 in the drawing represents a bending load produced by steering the steering handlebar 21. A range S1 in the drawing represents a length of a portion of the steering shaft 22 that is encased in the magnetostrictive torque sensor unit 26 upward from the upper bearing 24. A range S2 in the drawing represents a length of a portion of the steering shaft 22 that extends upward from the magnetostrictive torque sensor unit 26.

According to the embodiment, the upper bearing 24 is disposed above the L-shaped pipes 17, 17 extended above the vehicle body frame 2 and hence, the steering shaft portion between the upper bearing 24 and the lower bearing 25 has a comparatively long length, as is apparent from FIG. 1. By necessity, the length of the steering shaft 22 upward from the upper bearing 24 is defined to be shorter than that of the steering shaft 22 between the upper bearing 24 and the lower bearing 25, so that the steering shaft 22 that extends upward from the upper bearing 24 is reduced in flexural bending. Thus is achieved the reduction of the influence of bending on the magnetostrictive torque sensor unit 26 disposed upward from the upper bearing.

According to the embodiment, as shown in FIG. 3, the Pitman arm 54 is mounted to the lower end of the steering shaft 22. The Pitman arm 54 is provided with the tie rods 55, 55 for transmitting the steering force of the steering shaft 22 to the front wheels WF. The Pitman arm 54 is mounted to the steering shaft 22 at place downward from the lower bearing 25. In this arrangement, the Pitman arm 54 that applies the greatest bending load caused by the ground reaction force to the steering shaft 22 is disposed downward from the lower bearing 25 and hence, the two bearings are interposed between the Pitman arm 54 and the portion where the magnetostrictive torque sensor unit 26 is mounted. Thus, the bending load transmitted to the magnetostrictive torque sensor unit 26 can be reduced even further.

According to the embodiment, as shown in FIG. 3, the lower-bearing support bracket 47 for supporting the lower bearing 25 is mounted to the front sub-pipes 14, 14 of the vehicle body frame 2. The electric motor unit 27 is mounted to the lower-bearing support bracket 47. The steering shaft 22 upward from the lower bearing 25 is encased in the reduction gearbox 46 of the electric motor unit 27. The steering shaft 22 is supported by the bearings 51 and 52 in the reduction gearbox 46 having a length in the axial direction of the steering shaft 22. Therefore, the steering shaft 22 can be reduced in bending particularly caused by the electric motor unit 27 and the reaction force from the road surface.

Figure 5:
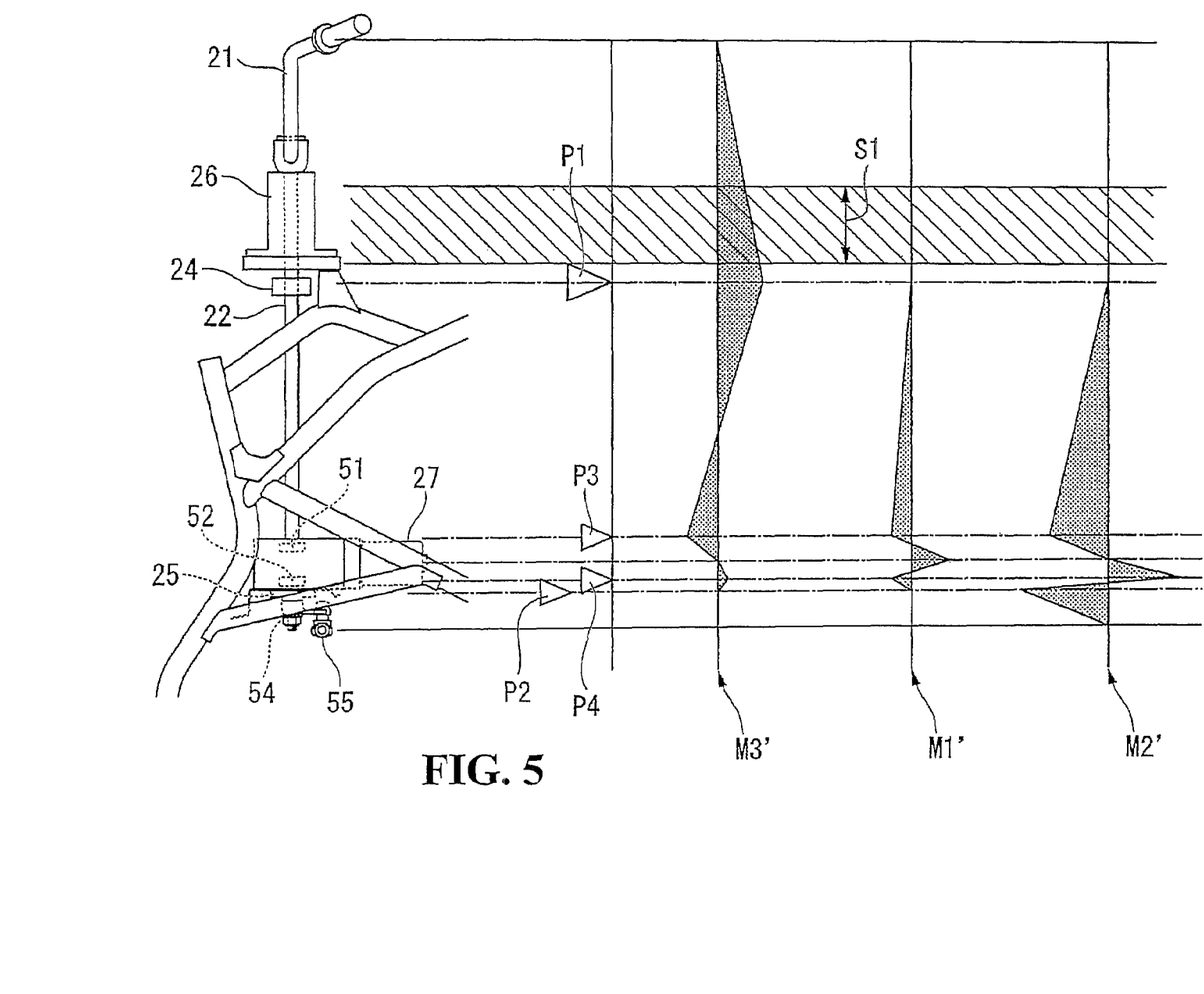
FIG. 5 is a diagram showing bending moment on the steering shaft of the steering system, particularly on the upper bearing, the lower bearing, a bearing in a reduction gearbox and the tie rod mounting portion thereof.

As shown in FIG. 5, the steering shaft 22 is supported by the bearing 51 at position P3 in the drawing and by the bearing 52 at position P4 in the drawing so that the bending or flexure of the steering shaft, represented by M1' in the drawing, which is caused by the motor load of the electric motor unit 27 and the bending or flexure of the steering shaft, represented by M2' in the drawing, which is caused by the ground reaction force transmitted from the road surface via the tie rods 55, 55 and the Pitman arm 54 are dispersed (load sharing). Accordingly, the bending of the steering shaft 22 can be suppressed. In FIG. 5, M3' represents a bending load (bending moment) caused by steering the steering handlebar 21. P1 and P2 in FIG. 5 represent the same as those in FIG. 4. Namely, P1 represents the position at which the upper bearing 24 supports the steering shaft 22 while P2 represents the position at which the lower bearing 25 supports the steering shaft 22. Just as in FIG. 4, the range S1 represents the length of the steering shaft 22 encased in the magnetostrictive torque sensor unit 26 disposed upward from the upper bearing 24.

According to the embodiment, the bending of the steering shaft 22 upward from the upper bearing 24 can be suppressed because the magnetostrictive torque sensor unit 26 is provided with the housing 37 that encases the first magnetostrictive film 30, the second magnetostrictive film 31, the first detecting coil 32 and the second detecting coil 33 and has the length in the axial direction of the steering shaft 22. This housing 37 is secured to the steering shaft 22 so as to be twisted together with the steering shaft 22. Therefore, the steering shaft 22 upward from the upper bearing 24 can be reduced in bending. Furthermore, the reduction of the number of components is achieved because the housing 37 is provided, on top thereof, with the mounting portion 44 for the steering handlebar 21 and this mounting portion 44 is mounted with the steering handlebar 21.

Figure 6:
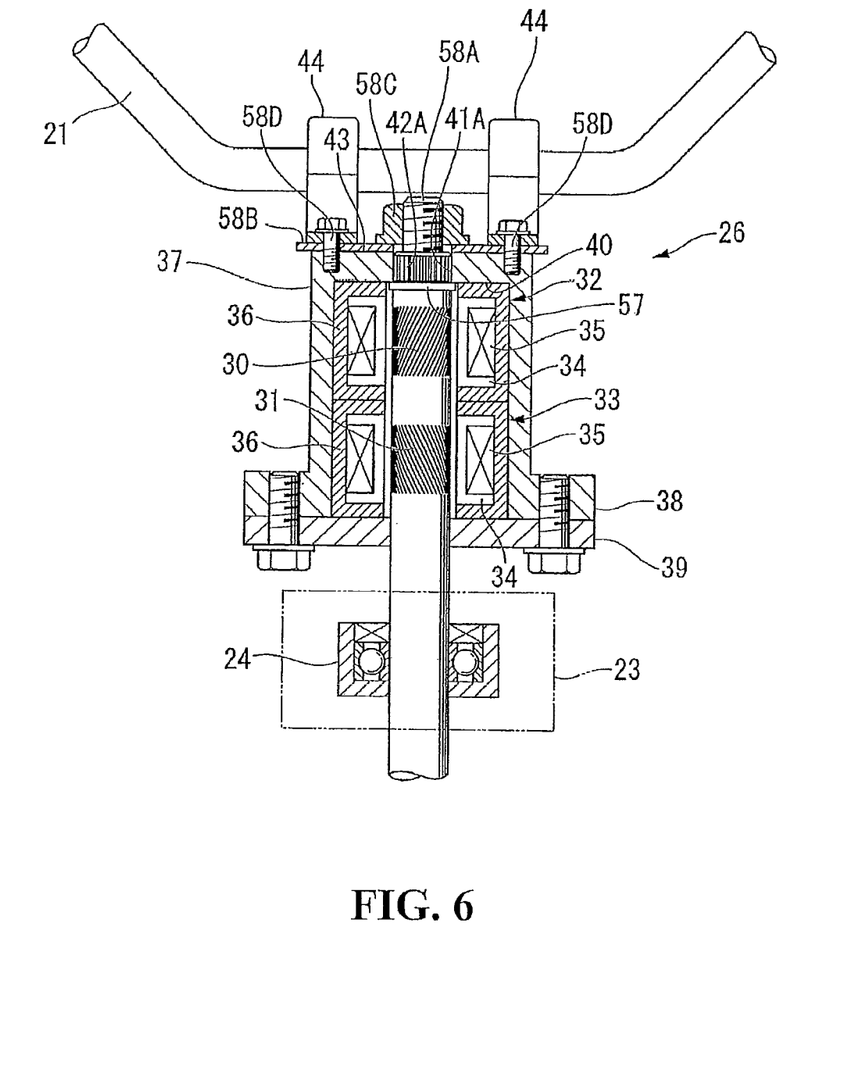
FIG. 6 is a sectional view of the upper part of the steering system for illustrating an exemplary modification of the first embodiment of the invention.
Figure 7:
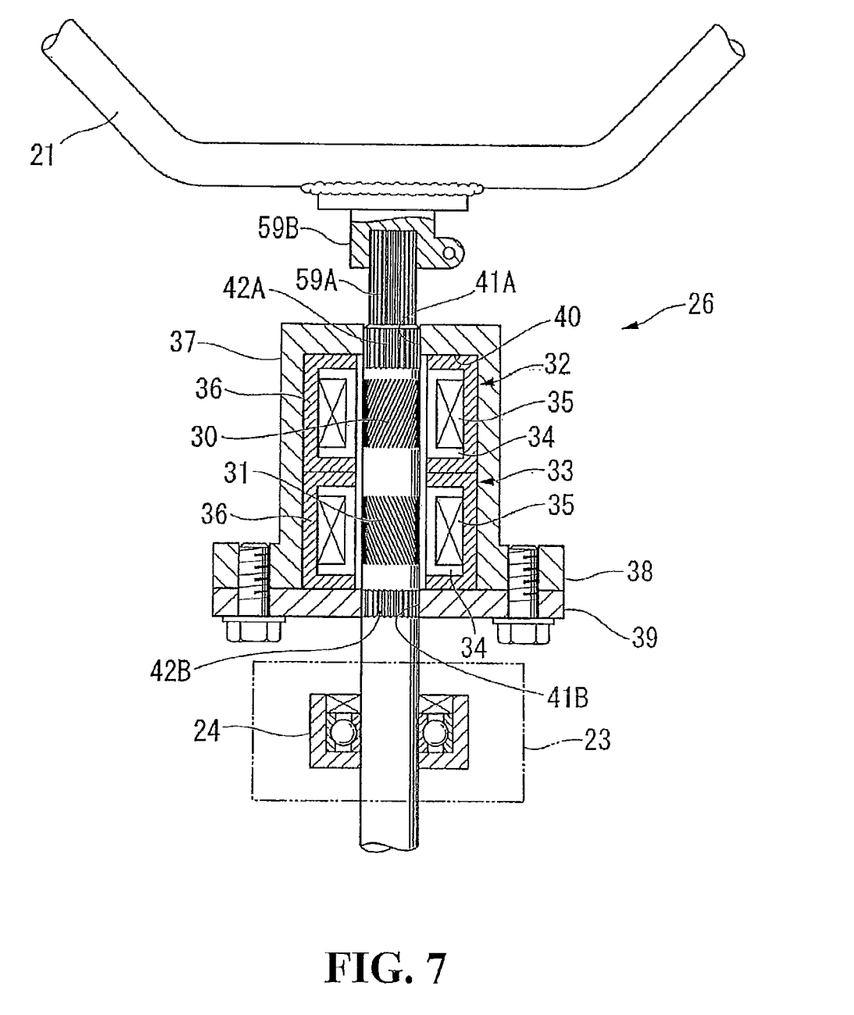
FIG. 7 is a sectional view of the upper part of the steering system for illustrating an exemplary modification of the first embodiment of the invention.

The steering handlebar 21 may also be mounted in other modes as shown in FIG. 6 and FIG. 7.

In FIG. 6, the spline hole 41A circumferentially formed with a plurality of grooves is formed centrally of the upper circumferential inside wall 40 of the housing 37 and the spline grooves 42A formed at the upper end of the steering shaft 22 are spline-fitted in the spline hole 41A. The steering shaft 22 is formed with a flange 57 immediately under the spline grooves 42A, the flange 57 abutting against the upper circumferential inside wall 40. The upper end of the steering shaft 22 is formed with a screw 58A projecting upward from the top of the housing 37. Disposed atop the housing 37 is a top bridge 58B which is formed of a plate member formed with a hole to be penetrated by the screw 58A. The screw 58A is threadedly engaged with a nut 58C, which holds the top of the housing 37 between the top bridge 58B and the flange 57. Bolts 58D, 58D are inserted through the top bridge 58B at right and left side portions thereof and anchored to the housing 37. The bolts 58D, 58D are also inserted into a bottom of the mounting portion 44 for the steering handlebar 21 so as to secure the mounting portion 44 to the housing 37. Namely, the bolts 58D, 58D secure the top bridge 58B and the mounting portion 44 to the housing 37 at a time. The steering handlebar 21 is mounted to the mounting portion 44.

In FIG. 7, the upper end of the steering shaft 22 is formed with a serrated portion 59A which projects upward from the housing 37. A handle bracket 59B is fixedly mounted to the serrated portion 59A with a split clamp. The steering handlebar 21 is securely welded to the handle bracket 59B.

Second Embodiment

Next, description is made of a second embodiment of the present invention. In this embodiment, a magnetostrictive torque sensor unit 60 has a different configuration from that of the first embodiment hereof. Hereinafter, like reference signs refer to the corresponding components and some of the detailed description thereof is omitted.

Figure 8:
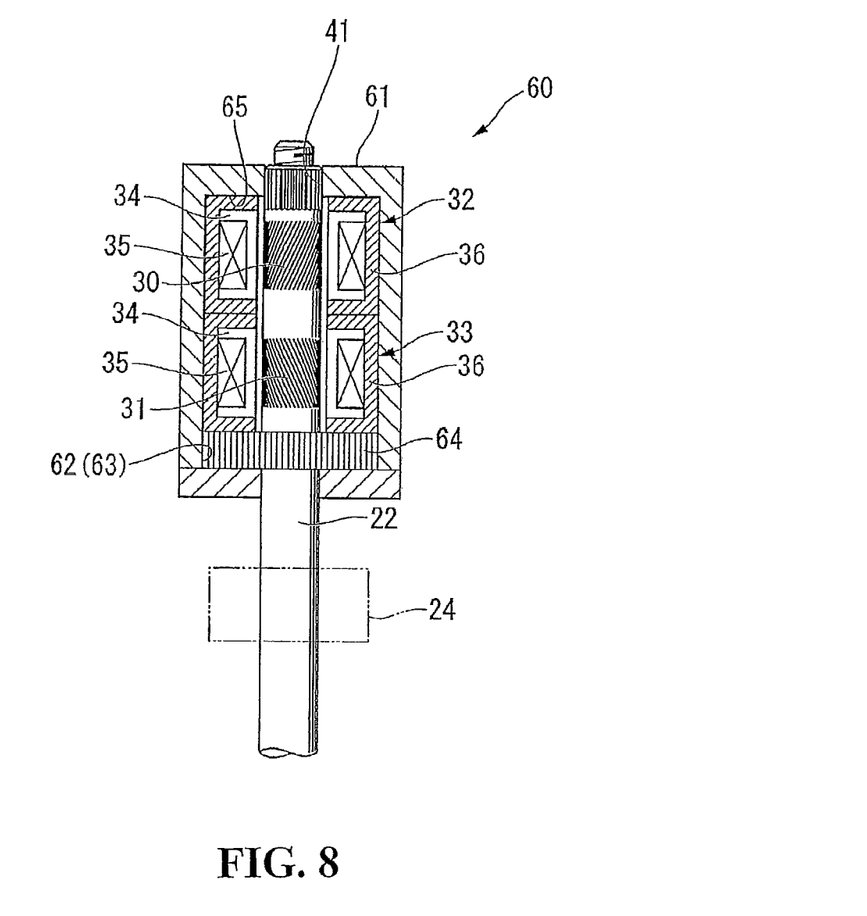
FIG. 8 is a sectional view showing an upper part of a steering system according to a second embodiment of the invention.

Similarly to the first embodiment, the magnetostrictive torque sensor unit 60 of this embodiment includes the first magnetostrictive film 30 and the second magnetostrictive film 31 formed on the steering shaft 22 and arranged one above the other, and the first detecting coil 32 and the second detecting coil 33 wound around the first magnetostrictive film 30 and the second magnetostrictive film 31, respectively, as shown in FIG. 8. The first detecting coil 32 and the second detecting coil 33 as a pair include the pair of upper and lower cylindrical coil bobbins 34, 34 penetrated by the steering shaft 22; the coils 35, 35 wound about the respective coil bobbins 34, 34; and the magnetic yokes 36, 36 accommodating the coil bobbins 34, 34 and the coils 35, 35. The detecting coils are accommodated in a housing 61 that is formed in a cylindrical shape to encase the upper part of the steering shaft 22 and that has a length in the axial direction of the steering shaft 22.

The housing 61 is open at a lower end so as to allow the steering shaft 22 to penetrate therethrough. The upper end of the steering shaft 22 is spline-fitted in a spline hole 41 which is formed centrally of a top of the housing and is circumferentially formed with a plurality of grooves. These coupling portions are welded together. A spline-coupling spline groove 63 circumferentially formed with a plurality of grooves is formed at a lower circumferential inside wall 62 of the housing 61. A disk-like spline coupling portion 64 press-fitted on the steering shaft 22 is spline-fitted in this spline groove 63. The coupling portions of the spline groove 63 and the spline coupling portion 64 are also welded together. The housing 61 retains the yokes 36, 36 between an upper circumferential inside wall 65 and the spline coupling portion 64, thus positioning the coils 35, 35 around the first magnetostrictive film 30 and the second magnetostrictive film 31.

According to the second embodiment as described above, the steering shaft 22 and the housing 61 are secured to each other at the two upper and lower points so that the steering shaft 22 upward from the upper bearing 24 can be further reduced in bending.

Third Embodiment

Next, description is made of a third embodiment of the present invention. In this embodiment, a magnetostrictive torque sensor unit 70 has a different configuration from that of the first embodiment hereof. Hereinafter, like reference signs refer to the corresponding components and some of the detailed description thereof is omitted.

Figure 9:
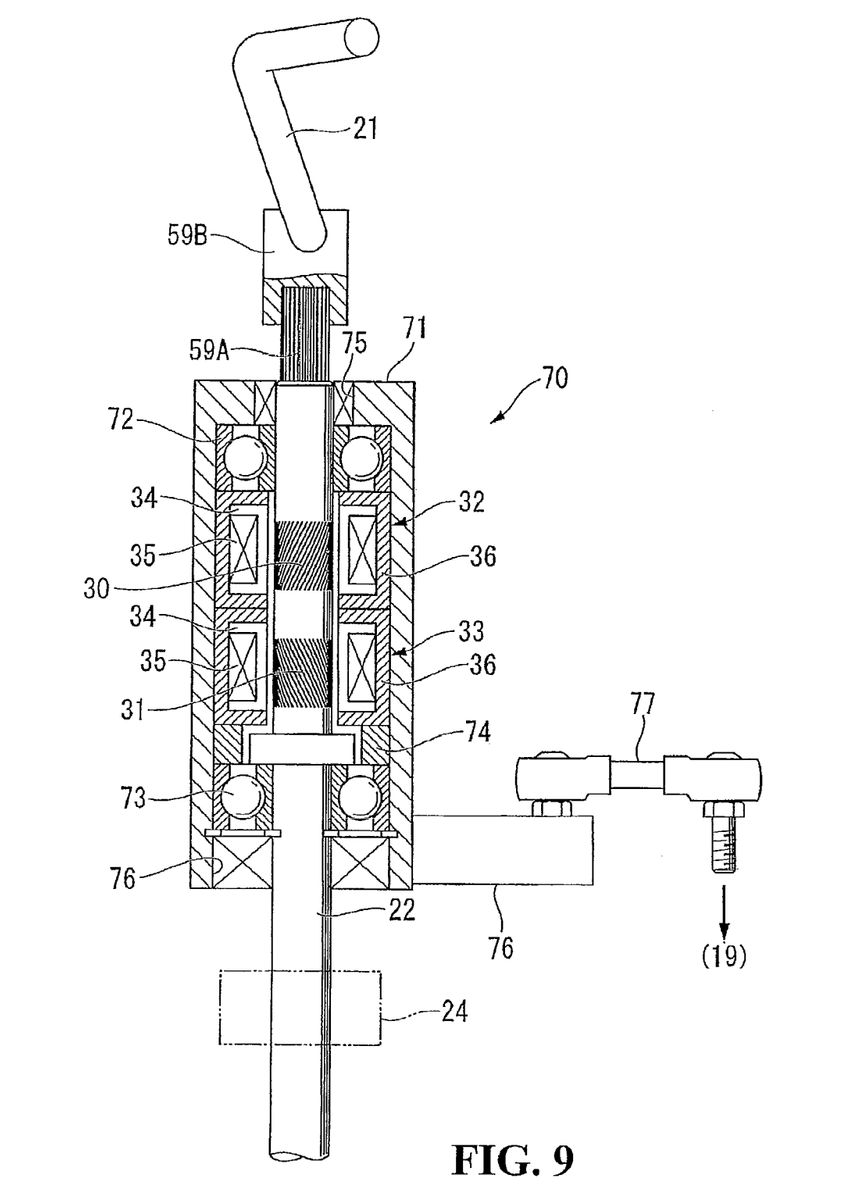
FIG. 9 is a sectional view showing an upper part of a steering system according to a third embodiment of the invention.

Similarly to the first embodiment, the magnetostrictive torque sensor unit 70 of this embodiment includes the first magnetostrictive film 30 and the second magnetostrictive film 31 formed on the steering shaft 22 and arranged one above the other, and the first detecting coil 32 and the second detecting coil 33 wound around the first magnetostrictive film 30 and second magnetostrictive film 31, respectively, as shown in FIG. 9. The first detecting coil 32 and the second detecting coil 33 as a pair include the pair of upper and lower cylindrical coil bobbins 34, 34 penetrated by the steering shaft 22; the coils 35, 35 wound about the respective coil bobbins 34, 34; and the magnetic yokes 36, 36 accommodating the coil bobbins 34, 34 and the coils 35, 35. The detecting coils are accommodated in a housing 71 that is formed in a cylindrical shape to encase the upper part of the steering shaft 22 and that has a length in the axial direction of the steering shaft 22.

The housing 71 contains therein bearings 72 and 73 on an upper side and a lower side thereof and retains the yokes 36, 36 between the bearing 72 and the bearing 73 with a spacer 74 interposed on one side, thus positioning the coils 35, 35 around the first magnetostrictive film 30 and the second magnetostrictive film 31. The steering shaft 22 is inserted through openings 75 and 76 formed in upper and lower sides of the housing 71 and is rotatably supported by the bearings 72 and 73. The housing 71 is formed with a stay 76 projected from an outer periphery thereof. The stay 76 is secured to the cross member 19, shown in FIG. 1, via a link 77. An alternative arrangement may be made such that the link 77 is omitted and the stay 76 is directly secured to the cross member 19. In this embodiment, the steering shaft 22 is formed with the serrated portion 59A shown in FIG. 7 while the steering handlebar 21 is mounted to the steering shaft by means of the handle bracket 59B.

According to the above-described third embodiment of the invention, the steering shaft 22 is supported by the bearings 72 and 73 in the housing 71 so that the bending of the steering shaft 22 upward from the upper bearing 24 can be suppressed.

Figure 10A:
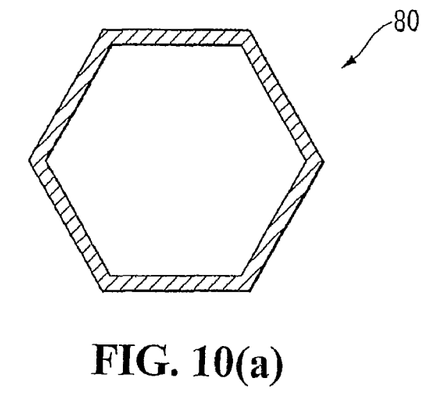
FIG. 10 is a group of diagrams illustrating exemplary modifications of the embodiment of the invention.
Figure 10B:
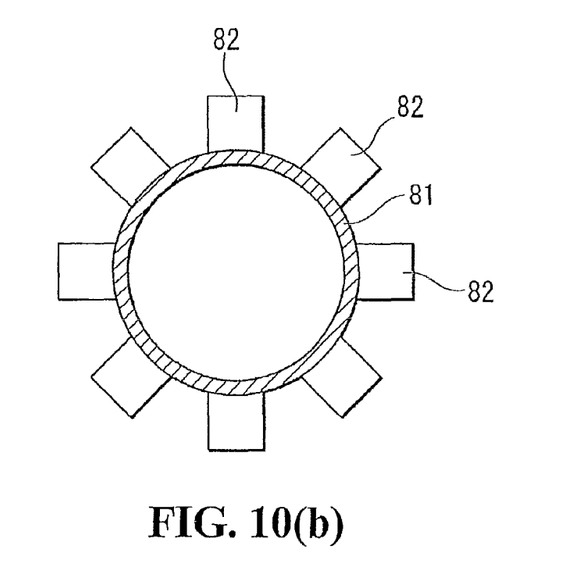

It is to be noted that the present invention is not limited to the first to third embodiments described above. In an exemplary modification of the above embodiments, for example, a housing 80 having a hexagonal cross section as shown in FIG. 10(a) may be employed. Otherwise, a housing 81 that has a circular cross section as shown in FIG. 10(b) and is formed with radial ribs 82 may also be employed. The above-described first and second embodiments illustrate the mode wherein the steering shaft 22 and the housing 37 or the housing 61 are spline-coupled together and then welded together whereby these components are integrated into one piece. However, these components may also be unified by force-fit, split clamp or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electric power steering apparatus for a saddle-ride type vehicle comprising:
    a steering handlebar;
    a steering shaft for transmitting a steering force of the steering handlebar to a wheel;
    an upper bearing provided at a location upward from a vehicle body frame constituting a vehicle body and rotatably supporting an upper part of the steering shaft;
    a lower bearing provided at a location downward from the vehicle body frame and rotatably supporting a lower part of the steering shaft;
    a torque sensor for detecting a torsional torque applied to the steering shaft; and
    an electric motor for imparting a steering force to the steering shaft based on the torsional torque detected by the torque sensor, the steering shaft extending through the electric motor, the electric motor having at least one bearing supporting the steering shaft,
    wherein the electric motor is mounted to the steering shaft between the upper bearing and the lower bearing, while the torque sensor is mounted to the steering shaft at a location upward from the upper bearing.

2. The electric power steering apparatus for a saddle-ride type vehicle according to claim 1, wherein the toque sensor is a magnetostrictive torque sensor including magnetostrictive films formed on the steering shaft and detecting coils wound around the magnetostrictive films.

3. The electric power steering apparatus for a saddle-ride type vehicle according to claim 1, wherein the steering shaft has a tie-rod mounting plate mounted to a lower end thereof, the tie-rod mounting plate is mounted with a tie rod for transmitting the steering force of the steering shaft to the wheel, and the tie-rod mounting plate is mounted to the steering shaft at place downward from the lower bearing.

4. The electric power steering apparatus for a saddle-ride type vehicle according to claim 1, wherein the vehicle body frame is provided with a lower-bearing support bracket for supporting the lower bearing, and the electric motor is mounted to the lower-bearing support bracket.

5. The electric power steering apparatus for a saddle-ride type vehicle according to claim 1, further comprising a cylindrical reinforcement case covering an outer periphery of the torque sensor and having a length in an axial direction of the steering shaft.

6. The electric power steering apparatus for a saddle-ride type vehicle according to claim 5, wherein the reinforcement case is secured to the steering shaft.

7. The electric power steering apparatus for a saddle-ride type vehicle according to claim 5, wherein the reinforcement case is provided, on a top thereof, with a mounting portion for the steering shaft.

8. The electric power steering apparatus for a saddle-ride type vehicle according to claim 5, wherein a reinforcement case is secured to the vehicle body frame and rotatably supports the steering shaft upward from the upper bearing by means of bearings.

9. An electric power steering apparatus for a saddle-ride type vehicle comprising:
   a steering shaft;
   an upper bearing rotatably supporting an upper part of the steering shaft;
   a lower bearing rotatably supporting a lower part of the steering shaft;
   a torque sensor for detecting a torque applied to the steering shaft; and
   an electric motor for imparting a steering force to the steering shaft based on the torque detected by the torque sensor, the steering shaft extending through the electric motor, the electric motor having at least one bearing supporting the steering shaft,
   wherein the torque sensor is mounted to the steering shaft at a location upward from the upper bearing.

10. The electric power steering apparatus for a saddle-ride type vehicle according to claim 9, wherein the electric motor is mounted to the steering shaft between the upper bearing and the lower bearing.

11. The electric power steering apparatus for a saddle-ride type vehicle according to claim 9, wherein the toque sensor is a magnetostrictive torque sensor including magnetostrictive films formed on the steering shaft and detecting coils wound around the magnetostrictive films.

12. The electric power steering apparatus for a saddle-ride type vehicle according to claim 9, wherein the steering shaft has a tie-rod mounting plate mounted to a lower end thereof, the tie-rod mounting plate is mounted with a tie rod for transmitting the steering force of the steering shaft to a wheel of the vehicle, and the tie-rod mounting plate is mounted to the steering shaft at place downward from the lower bearing.

13. The electric power steering apparatus for a saddle-ride type vehicle according to claim 9, wherein a vehicle body frame of the vehicle is provided with a lower-bearing support bracket for supporting the lower bearing, and the electric motor is mounted to the lower-bearing support bracket.

14. The electric power steering apparatus for a saddle-ride type vehicle according to claim 9, further comprising a cylindrical reinforcement case covering an outer periphery of the torque sensor and having a length in an axial direction of the steering shaft.

15. The electric power steering apparatus for a saddle-ride type vehicle according to claim 14, wherein the reinforcement case is secured to the steering shaft.

16. The electric power steering apparatus for a saddle-ride type vehicle according to claim 14, wherein the reinforcement case is provided, on a top thereof, with a mounting portion for the steering shaft.

17. The electric power steering apparatus for a saddle-ride type vehicle according to claim 14, wherein a reinforcement case is secured to a vehicle body frame of the vehicle and rotatably supports the steering shaft upward from the upper bearing by means of bearings.

18. The electric power steering apparatus for a saddle-ride type vehicle according to claim 9, wherein the electric motor has an upper bearing and a lower bearing supporting the steering shaft.

19. The electric power steering apparatus for a saddle-ride type vehicle according to claim 1, wherein the electric motor has an upper bearing and a lower bearing supporting the steering shaft.

* * * * *